United States Patent
Ponziani

(10) Patent No.: US 7,843,320 B2
(45) Date of Patent: Nov. 30, 2010

(54) TURN SIGNAL APPROPRITATE USE REMINDER SYSTEM

(76) Inventor: Richard Louis Ponziani, 1958 Home Path Ct., Centerville, OH (US) 45459

( * ) Notice: Subject to any disclaimer, the term of this patent is extended or adjusted under 35 U.S.C. 154(b) by 325 days.

(21) Appl. No.: 12/070,169

(22) Filed: Feb. 16, 2008

(65) Prior Publication Data

US 2009/0207012 A1 Aug. 20, 2009

(51) Int. Cl.
*B60Q 1/34* (2006.01)
(52) U.S. Cl. .................. 340/475; 340/457; 340/438
(58) Field of Classification Search .......... 340/438, 340/457, 465, 475, 476, 477, 478; 701/211, 701/213, 219; 303/146, 187
See application file for complete search history.

(56) References Cited

U.S. PATENT DOCUMENTS

| | | | |
|---|---|---|---|
| 2,114,731 A | 4/1938 | Howard | |
| 2,201,795 A | 5/1940 | Schnurpfeil | |
| 4,587,512 A | 5/1986 | Casey | |
| 4,878,170 A * | 10/1989 | Zeevi | 701/211 |
| 5,673,019 A | 9/1997 | Dantoni | |
| 5,944,393 A | 8/1999 | Sano | |
| 6,353,788 B1 | 3/2002 | Bäker et al. | |
| 6,356,189 B1 | 3/2002 | Fujimaki | |
| 6,426,694 B1 | 7/2002 | Larson | |
| 6,768,933 B2 | 7/2004 | Serezat | |
| 7,199,704 B2 * | 4/2007 | Herrig et al. | 340/471 |
| 2005/0200467 A1 | 9/2005 | Au | |
| 2009/0005984 A1 * | 1/2009 | Bradley | 701/213 |
| 2009/0174540 A1 * | 7/2009 | Smith | 340/465 |

* cited by examiner

*Primary Examiner*—Van T. Trieu

(57) ABSTRACT

A vehicle safety system to improve turn signal use by creating a conditioned response in the driver of a motor vehicle such that turn signals are used more appropriately over time. This is achieved using existing vehicle components to monitor a running recent history of executed turns, comparing each turn to the coinciding turn signal on/off status, and determining if turn signal usage was appropriate. If the recent history is indicative of neglectful turn signal usage, a reminder message is presented to the driver. If a driver is appropriately using turn signals nearly all of the time, then no reminder is ever presented, thus the system will never be considered a nuisance and is transparent to most drivers. Drivers who repeatedly neglect to use turn signals will over time increase usage and reminder messages will cease, thereby improving vehicle safety by increasing appropriate turn signal use.

16 Claims, 2 Drawing Sheets

TURN SIGNAL APPROPRITATE USE REMINDER SYSTEM

BACKGROUND OF THE INVENTION

This invention relates in general to motor vehicle lighting safety systems, and more particularly related to turn signals.

Motor vehicles sold in the United States are required by law to have a turn signal system such that a driver of a motor vehicle is able to signal intentions of an impending turn to other drivers. By activating a left or right turn signal via a hand operated lever, the driver is communicating directional intentions and thus is reducing the risk of a collision. The turn signal is an important safety feature that serves to prevent countless accidents each year. Appropriate turn signal usage makes an important contribution in attaining effective crash avoidance and passive safety. Usage of turn signals is required by law in virtually all jurisdictions, but the use of the turn signal in a motor vehicle is a voluntary act that is left to the discretion of the driver. Therefore, while all vehicles have the turn signal feature, diligent and proper use of turn signals is left solely to the driver's physical activation of the turn signal in appropriate situations as he or she would see fit.

Due to the voluntary nature of turn signal activation, it is therefore logical to conclude that proper usage of turn signals by all drivers in all locations would be less than 100%, assuming that driver neglect is the root cause. Other secondary causes of turn signal non-use would include various in-vehicle distractions which are greater in number now than in the past and cause a compromise in a driver's attention and contribute to turn signal neglect. Another contributor to turn signal neglect relates to marked dedicated turn lanes at intersections. Many drivers in specified turn lanes may not necessarily feel compelled to use a turn signal. This action may be rationalized by the driver since the vehicle is in a turn lane and may have an intersection traffic turn light, thus it is thought that other drivers already know his or her intended path. It remains important that the vehicle still use the appropriate turn signal in these situations, but commonly, they are not used. Additionally, turn signal non-use is still a violation of most local laws in these situations. Ideally, 100% compliance for all drivers would be the goal. In order to effectively reduce accident rates on a large scale, it would be desirable to have a system that would remedy a driver's neglect with regards to turn signal usage. The hypothetical perfect automatic turn signal system would be one that would accurately anticipate a pending vehicle turn a distance of a few hundred feet before the driver-intended turn and activate the correctly anticipated left or right turn signal at the appropriate point every time. However, no known practical automatic turn signal activation systems as such have been developed or are offered for sale. Unfortunately, this system would be highly complex, if at all possible given current technology and would literally involve a form of mind reading to anticipate the very thoughts of the driver. That is to say, such an automatic system could not know with certainty for instance, if a vehicle is going to turn left, turn right or go straight when approaching a simple four way stop intersection.

There are several cases of relevant art that teach automatic activation of turn signals at the point when a vehicle turn is initiated. These generally teach of an automatic activation that would indeed turn on the turn signal at the onset of a turn, and subsequently shut off the turn signal at the completion of the turn, based on a measured position of the steering system. This general method however, would not communicate the driver's intentions of a turn until the turn has begun, and thus would not adequately forewarn other drivers of a pending turn with sufficient time or travel distance. Additionally, these systems could not adequately distinguish a turn from a simple curve in the road. It is conceivable therefore, that turn signals of this type would be turning on and off in a seemingly random manner merely by steering the vehicle. This method would be considered an uncontrolled nuisance to all drivers and is likely the main reason these automatic systems are not in production. Other variations on automatic turn signals use other methods for automatically triggering turn signals, but these are not considered reliable or practical. None of these types of systems achieve the goal of consistently actuating the turn signal to effectively communicate the driver's intentions. Automatic turn signal activation systems like these described would not likely meet turn signal requirements as prescribed by the United States Government's National Highway Traffic Safety Administration and therefore would not be legal to sell as part of a vehicle turn signal system, nor would they satisfy laws regarding turn signal usage.

Alternatively, increasing turn signal usage amongst drivers might be achieved with increased enforcement of existing turn signal laws, but this effort would not be a widespread practical usage of law enforcement personnel and resources.

The types of prior art cited have surfaced over a long period of time and would serve to establish that there is a need for an improved system resulting in increased appropriate usage of turn signals. What is needed therefore is a practical, cost effective system residing within the vehicle whereby the driver who repeatedly neglects to use turn signals is effectively self-motivated to use turn signals such that usage approaches 100% over time, yet this system would not be a nuisance to drivers who consistently and appropriately use turn signals.

BRIEF SUMMARY OF THE INVENTION

It is an objective of the present invention to devise a simple, reliable, and relatively inexpensive reminder system built into a vehicle that would positively influence the goal of increasing a driver's turn signal usage. It is further an objective that the present invention would perform such that the driver who is neglectful of turn signal use is conditioned over time to use turn signals more appropriately and with greater frequency. Another objective of the present invention is that the presence of the system in a vehicle would be transparent to drivers who properly use turn signals, such that the reminder system of the present invention would never make its presence known to drivers who appropriately use turn signals nearly all of the time.

One aspect of the present invention is directed to a turn signal reminder system that uses the classic behavioral conditioning method to cause the driver to acquire the habit of using a turn signal in appropriate situations if he or she is a driver who habitually neglects to use a turn signal. A sufficient number of specifically defined turns, also known as qualified turns that are executed in the absence of a turn signal will eventually trigger a communication reminder message to the driver that suggests the use of the turn signal next time a turn is made. Repeated non-use will result in subsequent reminders. The driver will eventually act accordingly to avoid receiving repeated reminders. Therefore, voluntary usage of the turn signal over time becomes a conditioned response from the driver. Self-motivated turn signal usage is increased which results in a cessation of the reminders to the driver.

Another aspect of the present invention is that it also recognizes drivers who sufficiently utilize turn signals almost all of the time and thus renders no reminder whatsoever to these drivers, such that the system is never considered a nuisance or exhibits any hint of intrusiveness to most drivers.

Yet another aspect of the present invention is that it is a system that includes a means for detecting a turn in a motor vehicle, a means of detecting turn signal on or off status of the motor vehicle as actuated and ultimately controlled by the driver and a method of monitoring, recording and comparing qualified turns to the coinciding turn signal on or off status during the turn. A reminder message of fixed duration is communicated to the driver when a predetermined percentage of qualifying turns are executed that are absent an activated turn signal. This system recognizes and distinguishes a mere curve in the road from a specified turn, where a curve in the road would not warrant a turn signal. This system also allows for occasional turns without a turn signal like those that would occur while making maneuvers in a parking lot and will not produce a reminder to the driver in these instances.

Further, another aspect of the present invention is that it is a sentinel system where drivers who use turn signals appropriately, but with few exceptions will never receive a reminder while repeat non-users of turn signals will receive repeated reminders until they are conditioned over time to appropriately use turn signals. Non-use of turn signals can also be recorded within the vehicle for fleet owners to access this data pertaining to a particular vehicle or driver. It is important to note that this is a system that does not independently initiate a turn signal in a vehicle under any circumstance, but uses the human-in-the-loop to create an automatic system by virtue of the driver's actions. The present invention only senses, calculates, records and reminds the driver of recommended future turn signal usage, and exercises no direct on or off control of the turn signal.

Other aspects of the systems and/or methods according to the embodiments will be or become apparent to one with skill in the art upon review of the following drawings and detailed description. It is intended that all such additional systems and/or methods be within the scope of the present invention, and be protected by the accompanying claims.

DETAILED DESCRIPTION OF THE INVENTION

It should be noted that all descriptions of the present invention are for right hand turns. Similar computations can be made with respect to left hand turns, and those skilled in the art can manipulate versions of that which are illustrated in the present invention to accommodate contrasting, yet equally performing left turn modes. Turn signal appropriate use determination according to the present invention is independent of whether the turn was a left or a right turn, but only whether the use of the turn signal was appropriate for the turn. A turn is defined as a vehicle rotation about its vertical axis and is also known as yaw. A qualified turn is a turn executed by the motor vehicle meeting specific yaw and travel distance criteria. A driver is one who operates a motor vehicle and is in control of the travel path of the motor vehicle as well as the on or off status of the turn signal. A turn signal is a commonly known driver actuated lighting system by which a vehicle's external flashing lights forewarns of its intended path to other drivers.

Figure 1:
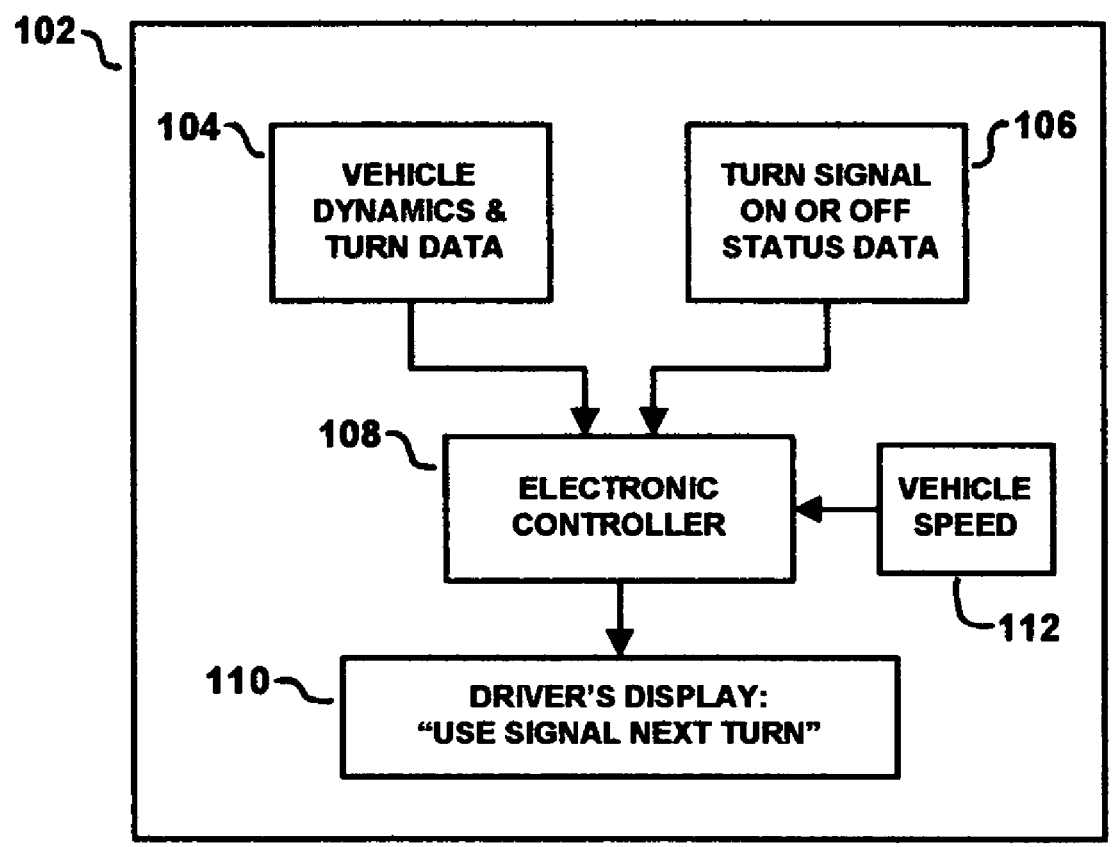
FIG. 1 illustrates a functional block diagram of the turn signal monitoring and appropriate use reminder system.

Referring now to the drawings, the turn signal monitoring and reminder system block diagram is illustrated in block 102 of FIG. 1. A means for compiling data within the vehicle regarding its ongoing travel path is represented in block 104. A means for detecting turn signal on or off status of the turn signal is represented in block 106. Both data outputs from block 104 and block 106 are directed to block 108, and electronic controller. An electronic controller such as that depicted in block 108 can comprise a vehicle body computer, a dedicated computer or some other means of comparing data, manipulating data, and controlling functions. Within block 108, the system is programmed to recognize turns represented by specific minimum yaw parameters that simultaneously occur within specific travel distances and then compares these turn events with the coinciding on or off status of the turn signal. The specific parameters stated will be further explained in the discussion relating to FIG. 2. Turn signal events that do not coincide with a driver-actuated turn signal are recorded as such and conversely, turn signal events that do coincide with to a driver-actuated turn signal are recorded as well. Also occurring within block 108 would be a record of a running history of each qualifying turn and its coinciding turn signal on or off status, the details of which will be further explained in the discussion relating to FIG. 2. When the system decides that a sufficient proportion of qualified turns were not represented by a coinciding driver-actuated turn signal, then it is determined that the driver is repeatedly neglectful of using the turn signal appropriately and the electronic controller of block 108 causes a short duration reminder message that is conveyed to the driver in block 110. In some situations monitored, the system may be programmed such that the turn executed warrants that a reminder message should be conveyed without consideration of the running history. The message is designed to inform that turn signal usage in the recent past has been inadequate with respect to the recent history of vehicle travel. As each qualifying turn event occurs without appropriate turn signal usage, then subsequent reminder messages are conveyed to the driver, based upon predetermined criteria. Reminder messages to the driver are intended to affect the driver's future use of turn signals. The driver will therefore strive to eliminate the repeat of reminder messages in the future. This would be achieved by virtue of the driver focusing efforts to utilize the turn signal more appropriately as the vehicle is driven.

What takes place over time is an altered behavior from the driver. When a driver receives a reminder message, it is received as a negative stimulus. This results in an elevated level of anxiety within the driver and thus the driver feels a compelling need to respond. The remedy for eliminating subsequent negative stimuli is made apparent to the driver via the message presented and consists of more appropriate turn signal usage and with greater frequency in the driving process. The resulting enhanced use of turn signals is the conditioned response that becomes a self-motivated, long term, automatic response.

As stated, it is an important aspect of this invention is that it is a transparent system to the driver who uses turn signals properly. In other words, a driver would never receive a reminder message if he or she appropriately uses turn signals nearly 100% of the time. Referring again to FIG. 1, recall that in block 108, a record is kept of a running history of qualifying turns and their corresponding turn signal on or off status. In the event that a sufficient portion of qualified turns are indeed represented by a coinciding driver-actuated turn signal, then no reminder warning is ever given. As an illustration by way of example, assume that the running history consists of a fixed quantity of 10 qualified turn events, and that the threshold that would yield a reminder message is a quantity of 3 turn-signal-absent-turns within the 10. If a driver fails to use the turn signal once or even twice within the preceding 10 turns, then no reminder message is presented to the driver. The threshold value of 3 and quantity of running history turns of 10 used in this example are optional values and may be altered within programming as set forth from the vehicle manufacturer. For the example with a fixed quantity 10 running history, threshold values greater than 3 would generally result in fewer reminder messages, while threshold values of less than 3 would generally result in more frequent reminder messages. Details of the running history method will be further explained in the discussion relating to FIG. 2

As a further enhancement to preventing nuisance reminder messages to a driver who appropriately uses turn signals most of the time, a minimum velocity threshold input from block 112 is a condition to establish each qualifying turn in which turn signal on or off status is recorded within block 108, FIG. 1. In other words, if a qualifying turn is measured, then the vehicle has to exceed a velocity of at least about 22 miles per hour in order for another qualifying turn would be recorded. What this accomplishes is that low velocity travel in circumstances such as parking lot maneuvers, most of which occur under about 22 miles per hour, will not be recorded and therefore an absence of driver-actuated turn signals in a multitude of sequential, low velocity turns will not result in a reminder message. In these low velocity circumstances, it is not always appropriate or necessary to use a turn signal. Details of this enhancement will be further explained in the discussion relating to FIG. 2

Referring once again to block 110 in FIG. 1, the method of presenting the message to the driver is at the discretion of the manufacturer. The message could be in a format of a visual, an audible, or a tactile means, or in any combination of one or more of these. Since the present invention is intended to provide a reminder to the driver and not necessarily a warning, by way of suggestion, an appropriate visual message might be one such as "USE SIGNAL NEXT TURN". This message in particular would fit within a 20 character display. Other messages may comprise the following content: "NEXT TIME, USE TURN SIGNAL"; "PLEASE USE TURN SIGNAL NEXT TIME". Such a message would be presented, then extinguish itself within a fixed limited time. The message would be presented as soon as the qualifying turn is completed, and suggested time duration for the message would be about 4 to 12 seconds. In keeping within the scope of the message being a reminder and not necessarily a warning, having the message illuminated in an amber color would be recommended in the present invention, whereas other colors such as red or green would also be acceptable. In all conditions and circumstances, it is recommended that no message should be presented when a vehicle is traveling in the reverse direction. Ultimately, message content, format, volume, size, color and duration would each be at the discretion of the manufacturer.

In the case of a vehicle with a message-changeable driver information display, this could be an ideal format for conveying the reminder message because the reminder system of this invention can be integrated into the vehicle in part by altering the display's programming, thereby avoiding any tooling or physical revisions to a driver's instrument cluster. If a message-changeable driver information display is not a practical medium, then a dedicated indicator light could alternatively be used.

Figure 2:
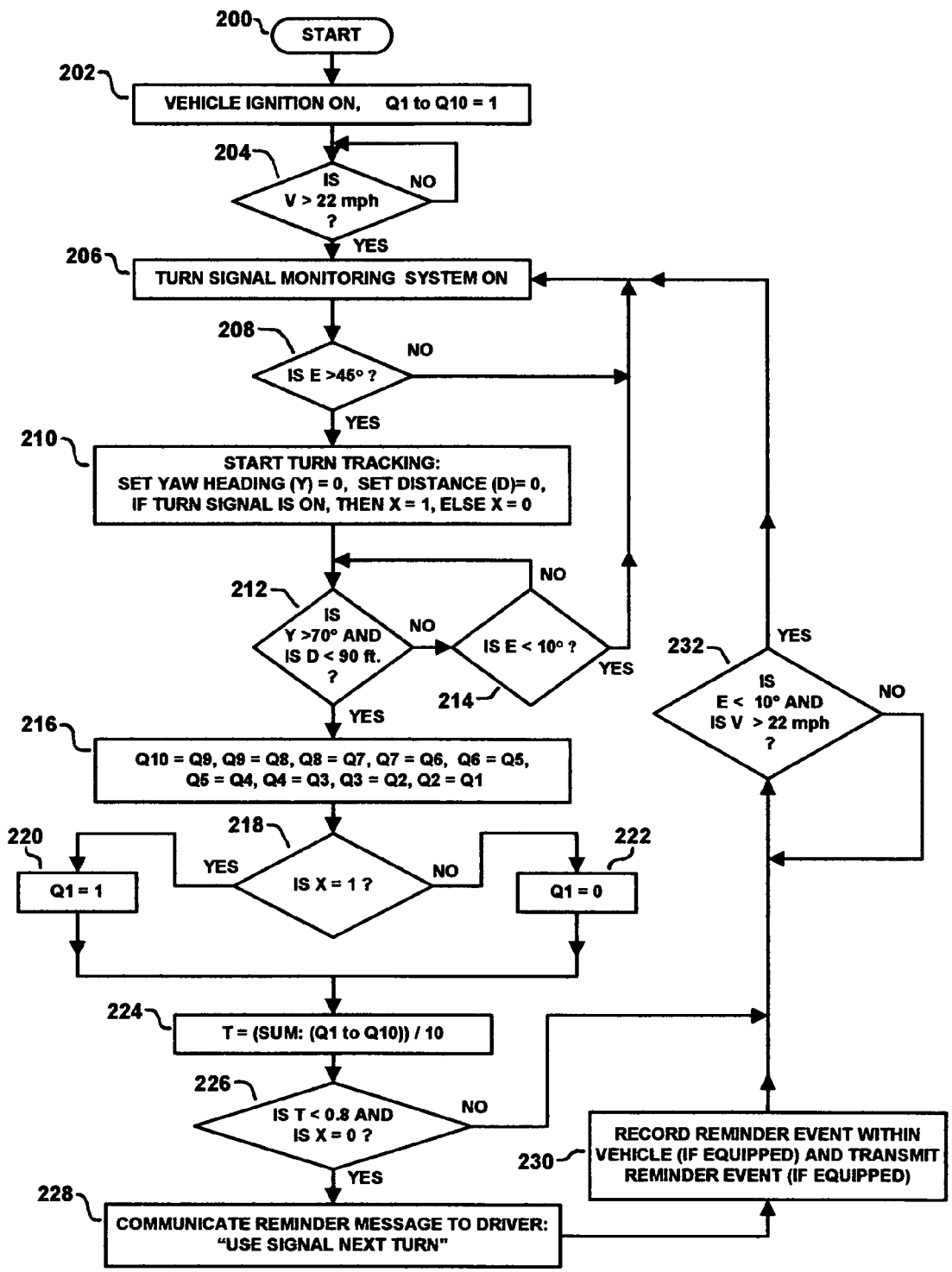
FIG. 2 depicts a basic version of the flow chart of events used by the turn signal monitoring and reminder system for conditioning a driver's long term turn signal usage behavior.

Referring now to the block diagram flow chart illustrated in FIG. 2, starting in step 200 and proceeding to step 202, as the ignition of the vehicle is turned on, values representing the running history of qualified turns and represented by Q1 through Q10 would each be initially set to a value of 1. In this example, values of Q are used to record the last ten qualified turns that are made by the vehicle, regardless of total distance travelled. In the illustration of FIG. 2, the last 10 qualified turns are recorded and any Q value of one (1) would represent a qualified turn in combination with a corresponding turn signal "on" status. Conversely, any Q value of zero (0) would represent a qualified turn in combination with a corresponding turn signal "off" status. By setting all Q values to 1 upon ignition turn on, the reminder system is initialized reflecting no turn signal neglect.

Next, referring to step 204, the system is awaiting a minimum vehicle velocity of about 22 miles per hour before the turn signal reminder system would be enabled where V represents the vehicle velocity. When the velocity threshold is attained, enabling of the turn signal detection and reminder system would then occur in step 206.

Continuing then to step 208, the real time steering wheel excursion is measured. Excursion is represented by E and is the angular position of steering wheel. Excursion is measured by many established methods and these methods are readily apparent for those skilled in the art in the motor vehicle industry. One such means is by directly measuring the steering angle with a steering angle sensor, such a device is that used for example, in conjunction with a vehicle stability control system. Another means of measuring steering wheel excursion E is by way of measuring the differential frequencies from the left and right wheel speed sensors on a common axle of a vehicle, such devices are those used for example, in conjunction with a vehicle anti-lock braking system. For the sake of disclosure of this invention, the values of E will represent the steering wheel angle in degrees as would be seen by the driver, where for example, ½ revolution right turn of the steering wheel would represent 180 degrees, e.g. E=180; ¼ revolution right turn of the steering wheel would represent 90 degrees, e.g. E=90; straight ahead would represent E=0. In step 208, E is a fixed minimum threshold that is chosen to be 45 degrees for the example of the present invention; however the threshold value of E is a fixed value that may be chosen by the manufacturer within a range of about 30 to 90 degrees. Therefore, in step 208, if E is greater than 45 degrees, then this indicates the onset of a turn.

When E becomes greater than 45 degrees, the logic flow moves from step 208 to step 210 and turn tracking is started, wherein a vehicle heading baseline is established in the value Y=0, where Y is defined as vehicle yaw, measured in degrees. Dynamic measurements of Y may be measured by many established methods and these methods are readily apparent for those skilled in the art of the motor vehicle industry. These methods include use of a vehicle dynamics sensor such as a yaw rate sensor component, differential travel distance data derived from wheel speed sensors, a combination of steering angle sensor plus a wheel speed sensor and data derived from global position satellite system.

Also within step 210, a vehicle travel baseline is established in the value of D=0, where D is vehicle travel distance measured in feet. Subsequent dynamic measurements of D may be measured based on outputs from data corresponding to wheel speed sensor data.

Finally in step 210, the turn signal on or off status is established for the coinciding turn that is currently being executed. X is used to represent the on or off status of the turn signal and its value will be used later in FIG. 2. If the turn signal is on, then X=1, and if the turn signal is off, then X=0. Note that the establishment of turn signal status is recorded at the onset of the turn, without regard as to whether the present turn will ultimately result in a qualified turn; however establishment of a coinciding turn signal on or off status can occur at any point in the turn and those skilled in the art can modify the programming to accommodate this measurement point.

Logic flow now moves from step 210 to step 212, where a determination is made if the measured onset of a turn will result in a qualified turn. A qualified turn is defined as a turn where the yaw Y of greater than 70 degrees that occurs within a travel distance D of less than 90 feet. This type of turn is sufficiently distinct, consisting of a measurably small average turn radius and sustained turn that it would be distinguished from a sweeping, large radius turn, the latter of which would represent the type of curve where a turn signal would not be appropriate. The values set forth in step 212 are chosen for illustration purposes, and a manufacturer may want to chose threshold values for Y and D that would be in the range about 50 to 90 for the threshold corresponding to Y and about 40 to 110 for the threshold corresponding to D.

Until a qualified turn is established within step 212, the steering wheel position is monitored in step 214 in a repeated loop from step 212 to step 214. If the steering wheel is returned to straight before a qualified turn is attained, that is, E crosses the threshold less than 10 degrees, then the logic flow would move from step 214 to step 206 and a qualified turn is never established in that cycle, and the process of awaiting the next qualifying turn starts over. If however, a qualified turn is indeed established within step 212, then the logic flow moves from step 212 to step 216.

In step 216, a form of register shift occurs where current Q10 is eliminated by redefining Q10 as Q9, or Q10=Q9. Q9 through Q2 are redefined as well: Q9=Q8, Q8=Q7, Q7=Q6, Q6=Q5, Q5=Q4, Q4=Q3, Q3=Q2, and Q2=Q1. This makes way for a new value of Q1, which would be established based on the outcome in steps 218, 220 and 222. If X=1, then Q1=1 and the logic flow moves into step 224. If X=0, then Q1=0 and the logic flow also moves into step 224.

In step 224, a value of T is established, where T is a proportion calculation consisting of the number of qualified turns that were represented by a coinciding turn signal divided by the number of qualifying turns recorded in the recent history, which in this example is 10. The logic flow moves then to step 226 wherein the value of T is examined. If T is less than 0.8, that is, qualified turns with less than 80% turn signal usage and the current value of X is equal to zero, then the logic flow moves to step 228. In step 228, a reminder message of fixed limited duration is then presented to the driver. From step 228, the logic flow moves to step 230 where a vehicle, if so equipped, would record the reminder message event for future data access. Such cumulative data could be useful to fleet operators, or owners of vehicles who have a vested interest in how their vehicles are being driven with respect to proper turn signal usage. Alternatively, the reminder message event could be transmitted via radio or satellite to be received elsewhere.

From step 230, the logic flow moves then to step 232, where at this stage the system waits for the steering wheel to be returned to straight, that is E is less than 10 degrees and also in step 232, the minimum velocity of 22 miles per hour is awaited. If both criteria are met, then the system is reset back to step 206 to await another onset of a turn.

Referring again to step 226, the logic flow moves to step 228 only when the X value is equal to zero. This logic ensures that even though T may be below the threshold, that, is, T is less than 0.8, thereby indicating a driver who has repeatedly neglected turn signal usage, a reminder message is not presented to the driver who just executed a qualifying turn and appropriately actuated a corresponding turn signal, where X would be equal to 1, in which case the logic flows from step 226 to step 232. This is in keeping with the spirit of the present invention that would seek to only remind the drivers who do not use turn signals appropriately.

It should be pointed out that the present invention, with a running history and intermittent reminder messages based in part on the running history, is a key element in the present invention that assures that drivers who chronically and repeatedly neglect the appropriate use of turn signals are presented timely reminders that will serve to positively change behavior of the driver with respect to turn signal usage. Conversely, the intermittent reminder feature of the present invention serves to assure that the system will not be considered a nuisance to a driver who practices good turn signal usage. A very good driver would never receive a turn signal reminder message in many thousands of miles of driving. Even a good driver may occasionally receive a reminder message, but this will serve as a friendly, no-consequence reminder to further refine his or her driving practices.

Implementation of the present invention is optimized by relying on the usage of existing vehicle component content for maintaining a low cost system and for overall efficiency. Existing vehicle dynamic sensors, existing bus networks, and existing driver displays may be utilized.

The present invention is compatible both major types of turn signal control systems. The traditional, mechanical, fixed shut-off trip turn signals as well as the newer, smart, computer controlled, sensor driven turn signal systems would both require no modifications to achieve compatibility. Only real time turn signal on or off status must be determined for the present invention. This information can usually be accessed in many vehicles using communication bus control network systems.

In some types of vehicles, the driver may desire the ability to disable the turn signal reminder system. This may be the case where a roadworthy vehicle would be occasionally used in situations such as on a racetrack or an off-road circumstance. For these reasons, it may be desirable for the manufacturer to offer the driver or vehicle owner an option to temporarily disable the reminder system. Alternatively, the manufacturer may design in a means by which a technician can disable the reminder, in order to allow for a disabling for compelling reasons only, yet those who are untrained could not easily disable the system.

The present invention is intended to comply with all Federal Motor Vehicle Safety Standards, specifically FMVSS 108, pertaining to vehicle lighting and turn signals. Additionally, the present invention is intended to comply with current Society of Automotive Engineers' standards and recommended practices pertaining to lighting and turn signals.

The above described embodiments are set forth by way of example and are not for the purpose of limiting the invention. It will be readily apparent to those skilled in the art that obvious modifications, derivations and variations can be made to the embodiments without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A vehicle turn signal monitoring and reminder system comprising: a means of monitoring a vehicle turn and a coinciding vehicle turn signal on or off status; a means of comparing said vehicle turn and said coinciding vehicle turn signal on or off status to make a determination of inappropriate turn signal usage based upon a first predetermined criteria; wherein said first predetermined criteria attainment is determined from computations comprised of monitored vehicle turn data and coinciding turn signal on or off status data; a means of determining if a second predetermined criteria is met based on at least one recent history said determination outcome of said first predetermined criteria; wherein said second predetermined criteria attainment is determined from turn signal usage rate computations; wherein a general usage turn signal reminder which is not directed to any specific future turn is initiated.

2. The vehicle turn signal monitoring and reminder system of claim 1, wherein said reminder substantially forms the basis for a communication to a driver of said vehicle.

3. The vehicle turn signal monitoring and reminder system of claim 2, wherein said communication can be manually disabled.

4. The vehicle turn signal monitoring and reminder system of claim 2, wherein said communication comprises at least one format selected from the group consisting of an audible format, and a tactile format.

5. The vehicle turn signal monitoring and reminder system of claim 2 wherein said communication comprises a visual format.

6. The vehicle turn signal monitoring and reminder system of claim 5, wherein said visual format is a message-changeable display.

7. The vehicle turn signal monitoring and reminder system of claim 1, wherein said reminder is intermittent based upon said second predetermined criteria.

8. The vehicle turn signal monitoring and reminder system of claim 1, wherein said first predetermined criteria comprises at least one input format selected from the group consisting of vehicle yaw, vehicle travel distance, and vehicle velocity.

9. The vehicle turn signal monitoring and reminder system of claim 8, wherein said at least one input format is derived using at least one vehicle dynamics sensor.

10. The vehicle turn signal monitoring and reminder system of claim 8, wherein said at least one input format is derived using a global positioning satellite system.

11. A method of conveying a turn signal reminder message to a driver of a vehicle comprising: configuring a means of monitoring a vehicle turn and a coinciding vehicle turn signal on or off status; configuring a means of using a first predetermined criteria to determine inappropriate use of a turn signal, wherein said first predetermined criteria attainment is determined from computations comprised of monitored vehicle turn data and coinciding vehicle turn signal on or off status data; configuring a means of determining if a second predetermined criteria is met based on at least one recent history said determination outcome of said first predetermined criteria; wherein said second predetermined criteria attainment is determined from turn signal usage rate computations; configuring a means of conveying a reminder message to said driver relating to turn signal usage, whereby said message substantially conveys a general recommendation for future turn signal usage, which is not directed to any specific future turn.

12. The method of claim 11, wherein said reminder message conveyed is intermittent based on said second predetermined criteria.

13. The method of claim 11, whereby said driver's future behavior is conditioned to use turn signals more appropriately.

14. The method of claim 11, whereby a driver's future behavior is conditioned to use turn signals with greater frequency.

15. The method of claim 11, whereby said message can be manually disabled.

16. A method of conveying a turn signal reminder message to a driver of a vehicle comprising: configuring a means of monitoring a vehicle turn and a coinciding vehicle turn signal on or of status; configuring a means of using a predetermined criteria to determine inappropriate use of a turn signal based upon said vehicle turn data and said coinciding vehicle turn signal on or off status data; configuring a means of conveying a reminder message to said driver relating to turn signal usage, whereby said message substantially conveys a general recommendation for future turn signal usage which is not directed to any specific future turn.

* * * * *